United States Patent [19]
Green

[11] 3,837,408
[45] Sept. 24, 1974

[54] TOOL BAR MOUNTING CLAMP
[75] Inventor: Edgar E. Green, Shelbyville, Tex.
[73] Assignee: Paul Abbott Co., Inc., Blytheville, Ark.
[22] Filed: May 22, 1973
[21] Appl. No.: 362,723

Related U.S. Application Data
[63] Continuation of Ser. No. 114,653, Feb. 11, 1971 abandoned.

[52] U.S. Cl................. 172/702, 172/763, 248/214
[51] Int. Cl............................................ A01b 15/00
[58] Field of Search ........... 172/245, 246, 248, 254, 172/439, 446, 448, 451, 650, 655, 675, 702, 763, 776; 248/72, 73, 214, 226 A, 228, 229; 280/415 A, 460 A, 461 A

[56] References Cited
UNITED STATES PATENTS
2,786,589  3/1957  Garrett...................... 172/248 X
3,289,771  12/1966  Bennett..................... 172/448 X FOREIGN PATENTS OR APPLICATIONS
345,779  12/1921  Germany.................... 172/702
910,269  11/1962  Great Britain.............. 172/446

Primary Examiner—Robert E. Pulfrey
Assistant Examiner—Paul T. Sewell
Attorney, Agent, or Firm—Dowell & Dowell

[57] ABSTRACT

Apparatus adjustably and reversibly mounted on a frame carried by a propelling vehicle and adapted to support a tool bar in a plurality of vertically spaced positions to accommodate a wide variety of implements with minimum movement of the frame.

6 Claims, 10 Drawing Figures

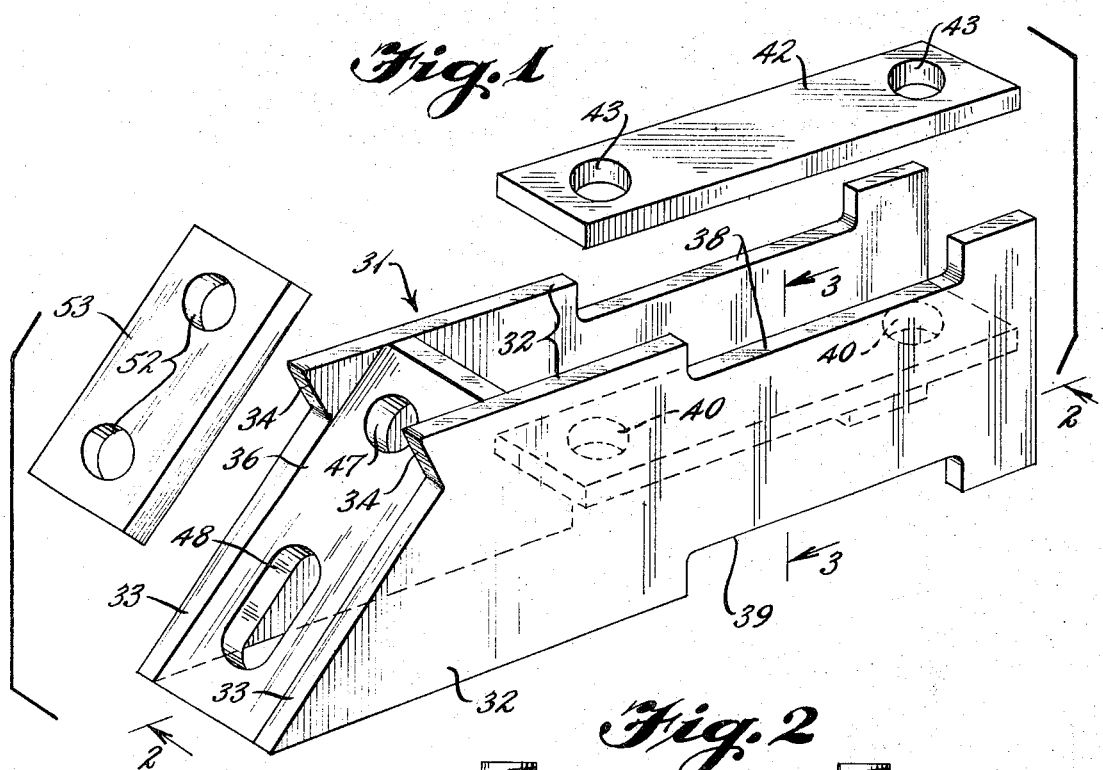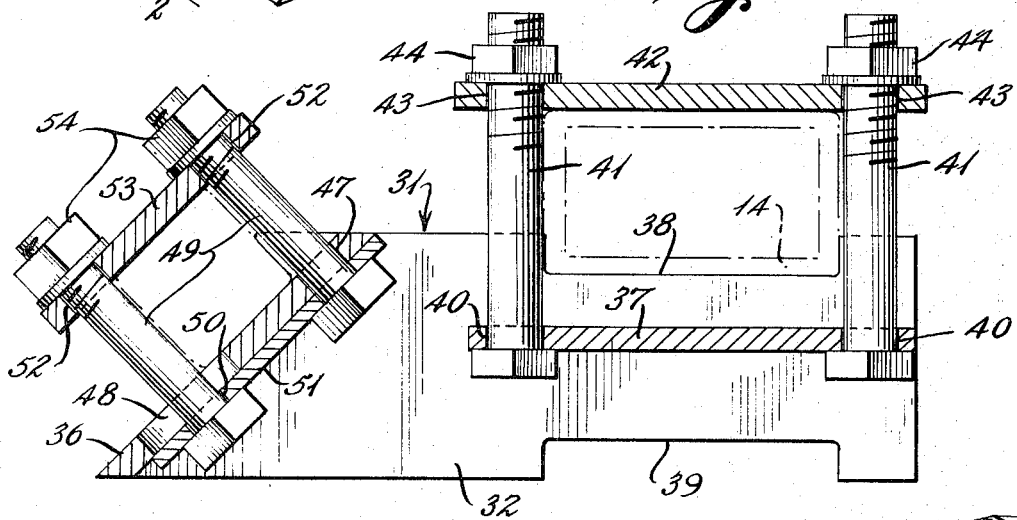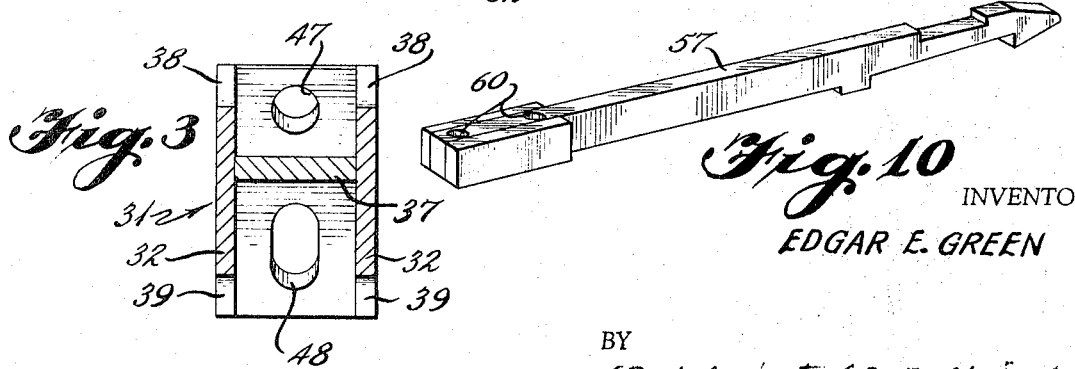

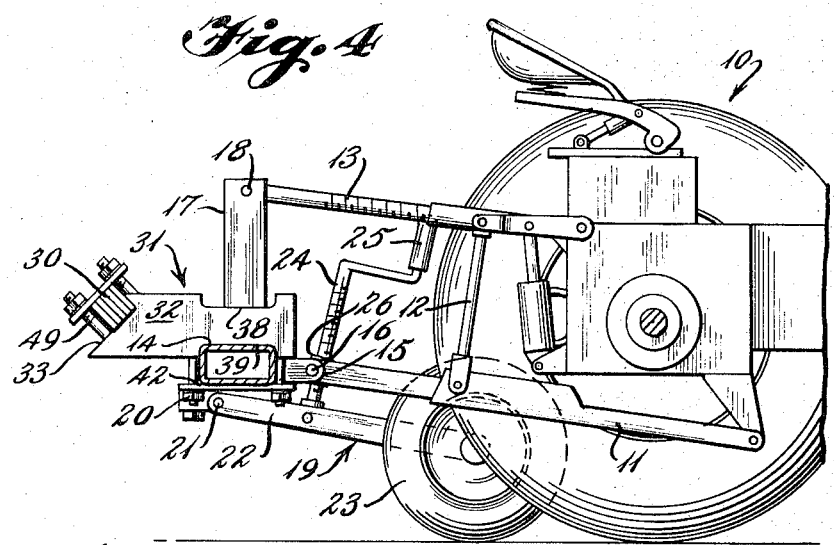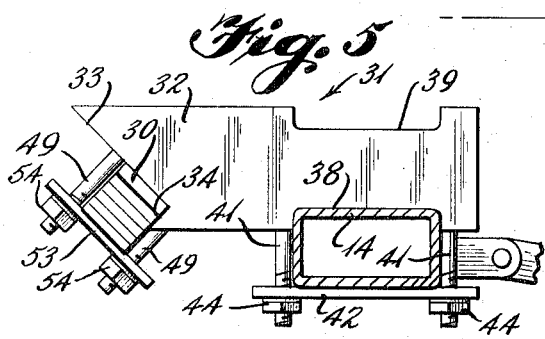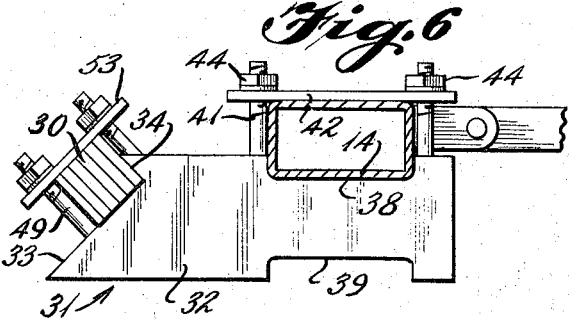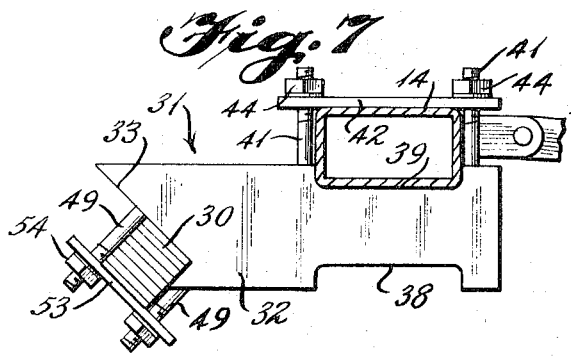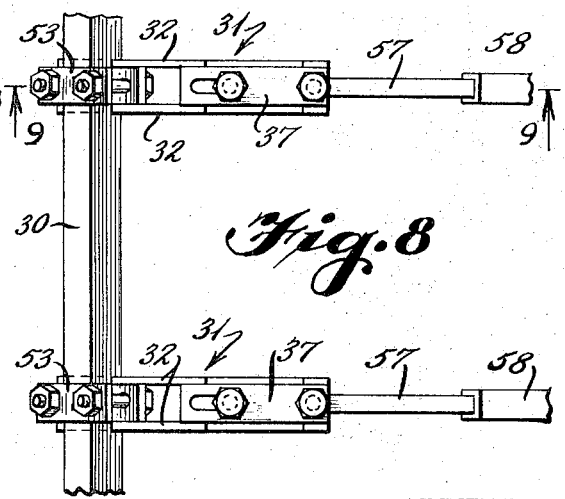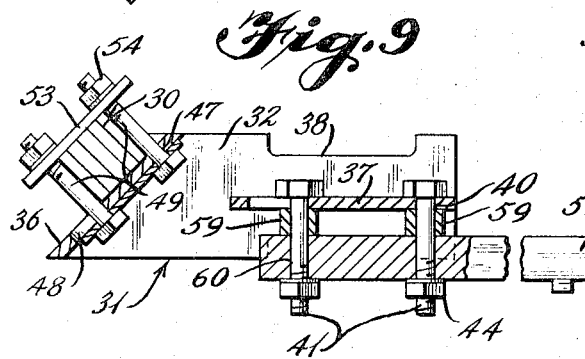

TOOL BAR MOUNTING CLAMP

This is a continuation of application Ser. No. 114,653, filed Feb. 11, 1971, now abandoned.

BACKGROUND OF THE INVENTION

1. Field of the Invention

The present invention relates generally to apparatus for mounting earth-working implements on a propelling vehicle and relates particularly to a clamp member adapted to support a tool bar in a plurality of vertically spaced positions.

2. Description of the Prior Art

Heretofore implement-supporting tool bars normally have been mounted on a frame which in turn was connected to either a three-point hitch or a two-point hitch carried by a propelling vehicle. Certain earth-working implements have been supported by the tool bar in a predetermined position above the ground and certain other earth-working implements have been connected to the tool bar at a different distance above the ground. Normally the difference in distances has been accommodated by raising and lowering the main frame by means of the implement hitch. This has not been satisfactory since raising the main frame by means of the hitch has reduced the amount of upward movement available to the main frame and therefore the amount of clearance between the implements and the ground as well as between the implements and any crop being grown. Also most implements utilize a depth gauge wheel or the like and the wide range of mounting means for the earth-working implements has necessitated depth gauge wheels having a wide range of adjustability and in some cases the adjustability of the depth gauge wheel has not been sufficient to accommodate all implements. Therefore, the range of implements available to a farmer has been limited to a particular type or make which could be used with the propelling vehicle or tractor owned by the farmer. Some efforts have been made to increase the adjustability of the tool bar mounting mechanism; however, these prior devices have not been successful for various reasons including the difficulty and expense of manufacturing and maintaining the devices, the lack of strength, and the wide range of adjustment necessary to include substantially all earth-working implements on the market.

SUMMARY OF THE INVENTION

The present invention is a tool bar mounting clamp for connecting a tool bar to a mounting frame carried by the hitch of a propelling vehicle. The clamp includes a reversible body having an angularly disposed tool bar engaging and clamping portion at one end. Means are provided for mounting the clamp on a frame or wide crossbar type draw bar with either the top or the bottom of the clamp being in engagement with the main frame or crossbar and on either the upper or lower surface thereof. By reversing the clamp and mounting the same on either the upper or lower surface of the draw bar, a wide range of implements can be mounted on the tool bar with a minimum amount of adjustability of the implement hitch or the depth gauge means.

It is an object of the invention to provide a tool bar mounting clamp which can be reversibly mounted on either the upper or lower surface of a frame and such clamp is provided with means for supporting a tool bar so that the longitudinal axis of the tool bar will be raised or lowered depending upon the position of the clamp relative to the support frame.

BRIEF DESCRIPTION OF THE DRAWINGS

FIG. 1 is an exploded perspective of the mounting clamp per se in which the fastening members have been omitted.

FIG. 2 is a section on the line 2—2 of FIG. 1 illustrating the device in assembled relation.

FIG. 3 is a section on the line 3—3 of FIG. 1.

FIG. 4 is a side elevation to a reduced scale illustrating one application of the invention.

FIGS. 5, 6 and 7 are enlarged sections illustrating the clamp in different positions relative to the mounting frame.

FIG. 8 is a top plan view of a modified form of the invention for mounting on a vehicle having a two-point hitch.

FIG. 9 is an enlarged section on the line 9—9 of FIG. 8.

FIG. 10 is a perspective of a two-point hitch tongue.

DESCRIPTION OF THE PREFERRED EMBODIMENTS

With continued reference to the drawings, as illustrated in FIG. 4, a tractor or propelling vehicle 10 is provided having a three-point or mast-type hitch including a pair of draft arms 11 adapted to be raised and lowered by lift arms 12. The pair of spaced generally parallel draft arms 12 provide two points of a three-point hitch and the third point is provided by an upper adjustable link 13 usually located along the longitudinal axis of the vehicle. In order to move a plurality of earth-working implements such as disk bedders, planters, seeders, coulter blades and the like across a field, a base or draw hitch mechanism frame 14 is provided having forwardly extending lugs 15 with mounting pins 16 thereon, and such pins are adapted to be connected to the outer ends of the draft arms 11. Generally centrally of the frame 14, an upright member or A-frame 17 is provided having a pin 18 for reception of the free end of the adjustable link 13.

At least one depth gauge assembly 19 is mounted on the frame 14 to regulate the vertical position of the frame above the ground when the vehicle is pulling the implements through the field. The assembly 19 includes a mounting clamp 20 for connecting the assembly 19 to the frame 14, and such clamp includes a pin 21 on which one end of an arm or yoke 22 is swingably mounted. A ground-engaging wheel 23 is rotatably mounted on the opposite end of the arm 22 to support the frame 14 when in operation. To control the vertical position of the frame, a crank 24 having an operating handle 25 threadedly engages a pivoted nut 26 carried by the clamp 20 and the lower end of such crank is freely rotatably supported by the arm 22. Rotation of the crank 24 swings the arm 22 up and down about the pin 21. The structure thus far described is conventional in the prior art and forms no part of the present invention.

Normally a tool bar 30 is clamped or otherwise mounted on the frame or draw bar 14 in spaced generally parallel relation thereto and in a position to receive a plurality of earth-working implements (not shown). In order to adjust the vertical position of the tool bar 30, a tool bar mounting clamp 31 is provided having a pair of relatively wide side members 32 with angularly disposed end portions 33. Preferably the end portions 33 are disposed substantially at a 45° angle and extend from one edge of each side member upwardly and rearwardly toward the other edge. A second angular portion 34 extends from the second edge of the side members 32 generally normal to the angular portion 33 and intersecting therewith at a point close to the second edge. The side members 32 are welded or otherwise connected together by a spacer 36 generally parallel with the angular end portions 33 and a spacer 37 located intermediate the edges of the side members adjacent to the end remote from the angular end portion 33.

In order to mount the clamp 31 to the frame 14, the side members 32 are provided with recesses 38 and 39 of a size to receive the frame 14. The intermediate spacer 37 is provided with a pair of spaced openings 40 for the reception of bolts or other fasteners 41 spaced sufficiently far apart to straddle the frame 14. A clamping plate 42 having openings 43 for receiving the bolts 41 is adapted to engage the opposite side of the frame 14 so that when nuts 44 threadedly engage the bolts 41 and are tightened, the plate will clamp the side members 32 to the frame 14.

Usually the frame or draw bar 14 is approximately four inches thick from top to bottom and is of hollow box construction in cross-section. The recesses 38 and 39 may be spaced any distance from each other, although a distance equal to the depth of the frame 14 has been found desirable. Also it has been found desirable to locate the point of intersection including the angular end portions 33 and 34 substantially in horizontal alignment with the recess 38 so that when the tool bar 30, which is generally square in cross-section, is mounted on the angular portion 33 and in abutting relation with the angular portion 34, the longitudinal axis of the tool bar will be substantially in alignment with the recess 38.

In order to mount the tool bar 30 on the mounting clamp 31, the spacer 36 is provided with an opening 47 adjacent one end thereof and an elongated slot 48 adjacent the opposite end. Bolts or other fasteners 49 extend through openings 50 in a spacer plate 51 and through the opening 47 and elongated slot 48, and such bolts are spaced sufficiently far apart to straddle the tool bar 30. At their outer ends, the bolts are received within openings 52 in a clamp plate 53 adapted to clampingly engage the tool bar 30 when nuts 54 are threaded onto the bolts 49 and tightened.

It is noted that spacer plates 51 and clamp plates 53 of different sizes and having openings spaced apart different distances could be provided to accommodate tool bars of different sizes.

In the operation of this modification of the device, the tool bar 30 is placed on the angular end portion 33 and in engagement with the angular end portion 34, after which the bolts 49 and clamp plate 53 are applied to attach the tool bar to the mounting clamp 31. As illustrated in FIG. 4, the mounting clamp is placed on the frame 14 with the recess 39 in engagement with the upper surface of the frame, after which the clamping plate 42 is clamped to the bottom surface of such frame and attached thereto by the nuts 44. In this position the longitudinal axis of the tool bar 30 is spaced substantially four inches above the upper surface of the frame 14. With reference to FIG. 5, the mounting clamp 31 has been reversed so that the recess 38 is in engagement with the upper surface of the frame 14 so that the longitudinal axis of the tool bar is substantially even with the upper surface of the frame. With reference to FIG. 6, the mounting clamp 31 has been connected to the bottom surface of the frame with the recess 38 in engagement therewith so that the longitudinal axis of the tool bar is substantially in alignment with the lower surface of the frame. With reference to FIG. 7, the mounting clamp has been reversed from its position in FIG. 6 and the recess 39 is in engagement with the lower surface of the frame 14 so that the longitudinal axis of the tool bar is spaced downwardly substantially below the lower surface of the frame.

It will be obvious from the foregoing that the tool bar can be mounted on the frame 14 in four different positions substantially in increments of four inches each, or a total of twelve inches from the uppermost position to the lowermost position.

With reference to FIGS. 8–10, a modified form of the invention is disclosed in which the frame 14 has been omitted and the tool bar 30 has been mounted on a pair of mounting clamps 31 carried by pronged hitch mechanism or tongues 57 of a two-point hitch. The tongues are received within sleeves 58 controlled by the lift mechanism of the vehicle. In this modification a pair of spaced collars 59 are disposed about the bolts 41 between the intermediate spacer 37 and the tongue 57 and such bolts extend through openings 60 in the tongues 57 to connect a mounting clamp 31 to each of the tongues 57. If desired a plurality of pairs of spacer collars 59 can be provided with such pairs being of different lengths to vary the spacing between the intermediate spacer 37 and the tongue 57. As in the prior modification, the mounting clamps 31 are reversibly mounted on the tongues 57 to locate the tool bar 30 at different elevations.

In the operation of this modification, the bolts 41 extend through openings 40 in the intermediate spacer 37, through spacer collars 59 and through openings 60 in the tongues 57 so that when the nuts 44 are applied and tightened, the mounting clamp 31 will be secured to the tongues 57. The spacer collars 59 may be omitted so that the tongues are in direct engagement with the spacer 37, or spacer collars 59 of different lengths may be substituted for the spacer collars illustrated.

I claim:

1. An apparatus for selectively and rigidly connecting a tool bar to a propelling vehicle hitch mechanism having upper and lower surfaces comprising an elongated body having a longitudinal axis located between upper and lower surfaces, first and second hitch engaging means located adjacent one end of said body and tool bar mounting means located adjacent the other end thereof, said first and second hitch engaging means being vertically spaced outwardly from and on opposite sides of the longitudinal axis of said body for selective engagement with the hitch mechanism, said tool bar mounting means being located so that the longitudinal axis of said tool bar is vertically spaced from the longitudinal axis of said body and between said upper and lower surfaces thereof, first clamping means for connecting a selected one of said hitch engaging means to one of said upper and lower surfaces of the hitch mechanism, and second clamping means for connecting said tool bar to said tool bar mounting means, whereby said tool bar may be selectively disposed at a plurality of elevations when said apparatus is engaged with the upper surface of the hitch mechanism and an additional plurality of elevations when engaged with the lower surface of the hitch mechanism.

2. The structure of claim 1 in which said body includes a pair of vertically disposed and generally parallel side members connected by first and second spacer means, said first spacer means being relatively horizontally disposed and connecting said side members adjacent said one end, and said second spacer means being disposed between said side members adjacent the other end thereof.

3. The structure of claim 2 in which said first and second hitch engaging means are mounted to a pronged hitch mechanism disposed between said side members and relatively spaced adjacent either side of said second spacer means.

4. The structure of claim 1 in which said first and second hitch engaging means include first and second draw bar engaging recesses disposed along the upper and lower surface of said body.

5. The structure of claim 4 in which said tool bar mounting means is located so that the longitudinal axis of said tool bar is in substantially horizontal alignment with said first draw bar engaging recess.

6. The structure of claim 1 in which said tool bar engaging means is disposed at substantially a 45° angle with the longitudinal axis of said body and extends generally downwardly and forwardly from the upper surface toward the lower surface thereof.

* * * * *